Patented Apr. 8, 1947

2,418,548

UNITED STATES PATENT OFFICE 2,418,548

4-AMINO-5-ARYLPYRIMIDINE

William Harris Davies and Alan Woodworth Johnson, Blackley, Manchester, England, assignors to Imperial Chemical Industries Limited, a corporation of Great Britain No Drawing. Application September 21, 1944, Serial No. 555,198. In Great Britain October 27, 1943

9 Claims. (Cl. 260—251)

1

This invention relates to the manufacture of new pyrimidine derivatives and more particularly to the manufacture of 4-amino-5-arylpyrimidines.

According to the invention we make the said 4-amino-5-arylpyrimidines by a process which comprises heating together formamide and a benzyl cyanide of the general formula Ar—CHR—CN where Ar is a phenyl group which may be unsubstituted or may carry simple substituents such as alkyl, halogeno, hydroxy, alkoxy or nitro and R is hydrogen or one of the following groups, namely, —CH=NH, —CH=N—Aryl, —CHO, or —CO—X, X being alkyl, alkoxy, aryl or aralkyl.

The invention is carried into practice by heating the reagents together at a temperature of at least 120° C., preferably at 170–180° C., and under conditions which permit or facilitate the elimination from the reaction zone of the water formed during the reaction. Conveniently they are heated together in a vessel provided with a reflux condenser so adjusted that it allows the water to escape but retains the formamide. In general it is advantageous also to carry out the reaction in a stream of ammonia gas.

If desired, the reagents may be dissolved in a solvent of suitable boiling point. An excess of formamide may conveniently be used as the solvent. There appears to be no particular advantage in using any other solvent.

Where an α-iminomethyl-benzyl cyanide (Ar—CH(CN)—CH=NH)

is used as starting material it may, if desired, itself be generated in situ from the benzyl cyanide (ArCH$_2$CN) and formamide. In this case, as will be seen, the process becomes simply the heating of the appropriate benzyl cyanide with at least two molecular proportions of formamide.

As suitable benzyl cyanides to be used as starting materials there may be mentioned, for example, benzyl cyanide, p-methylbenzyl cyanide, p-chlorobenzyl cyanide, p-hydroxybenzyl cyanide, p-methoxybenzyl cyanide, o-methoxybenzyl cyanide, p-nitrobenzyl cyanide, α-formylbenzyl cyanide, α-acetylbenzyl cyanide, α-benzoylbenzyl cyanide, (desyl cyanide), α-iminomethylbenzyl cyanide, α-phenyliminomethylbenzyl cyanide, α-phenyliminomethyl-p-nitrobenzyl cyanide and α-carboethoxybenzyl cyanide.

The following examples illustrate, but do not limit, the invention. The parts are by weight.

Example 1

30 parts of benzyl cyanide and 17 parts of formamide are heated together at 190° C. in a vessel provided with a reflux condenser for 14 hours. After cooling, the mixture is well washed with water whereby the excess of formamide is extracted. The residue is then shaken with ether and water to which sufficient dilute sulphuric acid has been added to make the mixture acid to Congo red. The pyrimidine compound is thus transferred to the aqueous layer. The layers are separated, the aqueous extract is clarified by heating with charcoal and is filtered. The filtrate is made alkaline to Clayton yellow by addition of caustic soda solution whereupon 4-amino-5-phenylpyrimidine is precipitated. This is filtered off, washed with water and dried. It then has M. P. 145–148° C. If desired it may be further purified by fractional distillation or by crystallisation from methyl alcohol, benzene or cyclohexane. When pure it melts at 152.5–153.5° C.

Alternatively, after cooling, the whole crude reaction mixture may be subjected to fractional distillation, whereby 4-amino-5-phenylpyrimidine is separated of B. P. 332–334°.

Example 2

117 parts of benzyl cyanide and 180 parts of formamide are stirred and heated together for 14 hours at 180° C. under a slow stream of ammonia gas. The water formed in the reaction is allowed to distil off. On cooling, 4-amino-5-phenylpyrimidine separates out and is filtered off. It is purified by dissolving it in water to which sufficient hydrochloric acid has been added to make the resulting solution acid to Congo red, clarified by treatment with decolourising charcoal and reprecipitated by adding sufficient caustic soda solution to make the mixture alkaline to Clayton yellow. The precipitate so formed is filtered off, washed with water and dried. The 4-amino-5-phenylpyrimidine is then obtained as a pale yellow powder of M. P. 151–153° C.

Example 3

145 parts of α-formylbenzyl cyanide and 226 parts of formamide are stirred and heated together for 1½ hours at 180° C. in a slow stream of ammonia gas and the water formed in the reaction is allowed to distil off. After cooling, the mixture is worked up as described in Example 1, whereby 4-amino-5-phenylpyrimidine is obtained as a yellow powder of M. P. 148–151° C.

α-Formylbenzyl cyanide may conveniently be made by treating an ether solution of benzyl cyanide and ethyl formate with sodium as described in Annalen 1896, 291, 202.

Example 4

159 parts of α-acetylbenzyl cyanide and 226 parts of formamide are stirred and heated for 6 hours at 180° C. in a slow stream of ammonia gas and the water formed in the reaction is allowed to distill off. The mixture is cooled and worked up as described in Example 1 whereby there is obtained not, as might be expected, a methyl derivative, but 4-amino-5-phenylpyrimidine.

α-Acetylbenzyl cyanide may conveniently be made by treating benzyl cyanide with ethyl acetate in ethyl alcohol and in presence of sodium ethoxide as described in Organic Syntheses, vol. 18, page 66.

Example 5

144 parts of α-iminomethylbenzyl cyanide and 180 parts of formamide are stirred and heated together at 180° C. for one hour in a slow stream of ammonia gas and the water formed in the reaction is allowed to distil out. After cooling, 4-amino-5-phenylpyrimidine is isolated as described in Example 1.

α-Iminomethylbenzyl cyanide is obtained in small proportions as a by-product in the reaction of benzyl cyanide and formamide. Thus, for instance, from the ether layer obtained in Example 1, fractional distillation yields some unchanged benzyl cyanide and a small proportion of α-iminomethylbenzyl cyanide. It may more conveniently be prepared by treating α-formylbenzyl cyanide with liquid ammonia and then heating the resulting addition product either in boiling toluene or alone at 140° C. as is more particularly described in copending application No. 15797/43, now British Patent 570,528.

Example 6

10 parts of α-phenyliminomethylbenzyl cyanide and 23 parts of formamide are stirred and heated together for 7 hours at 180° C. in a slow stream of ammonia gas and the water formed in the reaction is allowed to distill off. After cooling, 4-amino-5-phenylpyrimidine is isolated as described in Example 1.

α-Phenyliminomethylbenzyl cyanide may conveniently be made by heating benzyl cyanide with diphenylformamidine as described in Berichte 1902, 35, 2506.

Example 7

194 parts of p-chlorobenzyl cyanide and 260 parts of formamide are heated and stirred together for 7 hours at 180° C. in a slow stream of ammonia gas and the water formed in the reaction is allowed to distil off. On cooling, 4-amino-5-p-chlorophenyl-pyrimidine separates out. It is filtered off, washed with water and purified by the method described in Example 2. It then has M. P. 202–204° C.

p-Chlorobenzyl cyanide may conveniently be made by treating p-chlorobenzyl chloride with alcoholic potassium cyanide as described in Journal für praktisches Chemie 1900, (2) 61, 187.

Example 8

113 parts of p-hydroxybenzyl cyanide and 190 parts of formamide are heated and stirred together for 6 hours at 180° C. in a slow stream of ammonia gas and the water formed in the reaction is allowed to distil off. After cooling, the crude product is washed by decantation with water and then crystallised from methanol. There is thus obtained 4-amino-5-p-hydroxyphenyl-pyrimidine of M. P. 288–290° C.

p-Hydroxybenzyl cyanide may conveniently be made as described in Berichte 1902, 35, 4403.

Example 9

184 parts of p-methoxybenzyl cyanide and 280 parts of formamide are heated together for 7 hours at 180° C. under the conditions described in Example 2. After cooling, water is added, whereupon 4-amino-5-p-methoxyphenylpyrimidine separates out and is filtered off. It is purified by dissolving in hot dilute (2 normal) hydrochloric acid, cooling, filtering off the precipitated hydrochloride (which has M. P. 268–270° C.) and then basifying whereby 4-amino-5-p-methoxyphenyl-pyrimidine of M. P. 164–165° C. is obtained.

p-Methoxybenzyl cyanide may conveniently be made by methylating the hydroxy derivative as described in Berichte 1889, 22, 2139.

Example 10

180 parts of o-methoxybenzyl cyanide are stirred and heated at 180° C. under the conditions described in Example 2. 580 parts of formamide are gradually added during 4½ hours. In this case the reaction goes more slowly and if the formamide is not gradually added, much of it decomposes before it reacts. After cooling, the product is worked up as described in Example 1 whereby 4-amino-5-o-methoxyphenyl-pyrimidine of M. P. 176–177° C. is obtained.

o-Methoxybenzyl cyanide may conveniently be made as described in Berichte 1900, 33, 166.

Example 11

34 parts of α-phenyliminomethyl-p-nitrobenzyl cyanide and 51 parts of formamide are heated together at 180° for 7 hours under the conditions described in Example 2. After cooling, the mixture is boiled with 100 parts of water to which sufficient concentrated hydrochloric acid is added to make the mixture permanently acid to Congo red. The solution so obtained is clarified by heating with kieselguhr and filtered hot. Crude 4-amino-5-p-nitrophenyl-pyrimidine is then precipitated by adding an excess of sodium hydroxide. It may be purified by crystallising the hydrochloride (which melts at 302–304° C. with decomposition) from 2-normal hydrochloric acid and recovering the base by treatment with sodium hydroxide. If desired the base may be crystallised from alcohol or from dioxan. It has M. P. 241–242° C.

α-Phenyliminomethyl-p-nitrobenzyl cyanide may conveniently be made from p-nitrobenzyl cyanide and diphenylformamidine as described in Journal of the American Chemical Society 1936, 58, 1334.

Example 12

19 parts of α-carboethoxybenzyl cyanide and 80 parts of formamide are stirred and heated together for 5 hours at 180° in a slow stream of ammonia gas, the volatile products from the reaction being allowed to distil off. The mixture is then cooled and worked up as described in Example 2 to give 4-amino-5-phenylpyrimidine.

α-Carboethoxybenzyl cyanide may conveniently be made by interaction of benzyl cyanide with ethyl carbonate in the presence of sodium ethoxide as described in the Journal of the American Chemical Society, 1942, 64, 576.

The 4-amino-5-arylpyrimidines of this invention are useful as intermediates in the manufacture of substances of commercial utility, particularly for compounds for pharmaceutical purposes, for example for use as anti-bacterial agents.

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claims.

We claim:

1. Process for the manufacture of 4-amino-5-arylpyrimidines which comprises heating together formamide and a benzyl cyanide of the formula Ar—CHR—CN wherein Ar is selected from the class consisting of phenyl, alkylphenyl, halogenophenyl, hydroxyphenyl, alkoxyphenyl, and nitrophenyl and R is selected from the class consisting of hydrogen, —CH=NH, —CH=N—Aryl, —CHO, —CO—Alkyl, —CO—O—Alkyl, —CO—Aralkyl, and —CO—Aryl and recovering said 4-amino-5-arylpyrimidines.

2. Process as claimed in claim 1 wherein the benzyl cyanide is an α-iminomethyl-benzyl cyanide which is generated in situ from formamide and a benzyl cyanide of formula Ar—CH₂CN.

3. Process as claimed in claim 1 wherein the benzyl cyanide of the formula Ar CH₂CN, wherein Ar is as above, is heated with at least two mols, per mol of cyanide, of formamide and in a stream of ammonia gas.

4. Process for the preparation of 4-amino-5-phenylpyrimidine which comprises heating alpha-iminomethylbenzyl cyanide with formamide and recovering said 4-amino-5-phenylpyrimidine.

5. Process according to claim 4 wherein the alpha-iminomethylbenzyl cyanide is prepared in situ from benzyl cyanide and formamide.

6. Process for the preparation of 4-amino-5-phenylpyrimidine which comprises heating formamide with benzyl cyanide and recovering said 4-amino-5-phenylpyrimidine.

7. Process of claim 6 wherein the benzyl cyanide is heated with at least two mols, per mol of benzyl cyanide, of formamide and in a stream of ammonia gas.

8. 4-amino-5-phenylpyrimidine.

9. A 4-amino-5-arylpyrimidine wherein the amino is a primary amino, the aryl is selected from the group consisting of phenyl, alkylphenyl, halogenophenyl, hydroxyphenyl, alkoxyphenyl, and nitrophenyl and the amino and aryl are the only substituents, other than hydrogen, on the pyrimidine ring.

WILLIAM HARRIS DAVIES.
ALAN WOODWORTH JOHNSON.

REFERENCES CITED

The following references are of record in the file of this patent:

UNITED STATES PATENTS

| Number | Name | Date |
|--------|------|------|
| 2,312,691 | D'Alelio | Mar. 2, 1943 |
| 2,324,283 | D'Alelio | July 13, 1943 |

OTHER REFERENCES

Chem. Abstracts, vol. 35, page 1052.